United States Patent [19]

Lechner et al.

[11] Patent Number: 4,709,256

[45] Date of Patent: Nov. 24, 1987

[54] WIDE SCREEN COMPOSITE VIDEO SIGNAL ENCODER AND STANDARD ASPECT RATIO DECODER HAVING BARST AND SUBCARRIER COMPONENTS OF DIFFERENT FREQUENCIES

[75] Inventors: Bernard J. Lechner; Kerns H. Powers, both of Princeton, N.J.

[73] Assignee: RCA Corporation, Princeton, N.J.

[21] Appl. No.: 838,755

[22] Filed: Mar. 12, 1986

[51] Int. Cl.⁴ ............................................ H04N 11/14
[52] U.S. Cl. ....................................... 358/11; 358/12; 358/16; 358/19
[58] Field of Search ...................... 358/11, 12, 19, 16, 358/140

[56] References Cited

U.S. PATENT DOCUMENTS

| | | | |
|---|---|---|---|
| 3,617,626 | 11/1971 | Bluth et al. | 358/11 |
| 3,872,498 | 3/1975 | Pritchard | 358/30 |
| 4,370,672 | 1/1983 | Ross et al. | 358/19 |
| 4,476,484 | 10/1984 | Haskell | 358/16 |
| 4,551,754 | 11/1985 | Meise et al. | 358/180 |
| 4,651,208 | 3/1987 | Rhodes et al. | 358/140 |

OTHER PUBLICATIONS

Broder Wendland, Aspect Ratio Selection, SMPTE Journal, Oct. 1983, pp. 1034–1035.

Primary Examiner—John W. Shepperd
Attorney, Agent, or Firm—Paul J. Rasmussen; Peter M. Emanuel; Richard G. Coalter

[57] ABSTRACT

A wide screen video signal is encoded for transmission as a composite signal having standard line and field rates and the standard frequency color burst. The signal includes chrominance components modulated on a color subcarrier frequency greater than the standard in proportion to the aspect ratio of the wide screen signal divided by the aspect ratio of the standard. A decoder converts the wide screen signal to a given broadcast standard without component separation or chroma demodulation by time expanding center samples of each active line of the wide screen signal.

2 Claims, 7 Drawing Figures

WIDE SCREEN COMPOSITE VIDEO SIGNAL ENCODER AND STANDARD ASPECT RATIO DECODER HAVING BARST AND SUBCARRIER COMPONENTS OF DIFFERENT FREQUENCIES

FIELD OF THE INVENTION

This invention relates to wide screen television systems and to decoders for converting wide screen composite video signals to a form suitable for display on conventional television receivers.

BACKGROUND OF THE INVENTION

Reitmeier et al., in U.S. patent application Ser. No. 576,915 filed Feb. 3, 1984 now U.S. Pat. No. 4,622,577, describe a television signal transmission format in which a wide-screen image is conveyed by an "NTSC-like" composite video signal. The line-rate, field-rate and color subcarrier frequency all conform to NTSC transmission standards but the "active" portion of each scan line represents a wide screen image, that is, an image having an aspect ratio greater than the aspect ratio (4:3) of conventional television receiver displays. In an embodiment of their invention the transmitted picture has an aspect ratio of 5:3. If such a signal were to be displayed on a conventional television receiver having a 4:3 aspect ratio kinescope, the image would appear to be compressed horizontally. To avoid such distortion, Reitmeier et al. describe a decoder which provides aspect ratio reduction from 5:3 to 4:3 by cropping the edges of the wide screen image. This is done by sampling the center portion of each line of the wide screen signal that corresponds to a 4:3 aspect ratio picture and time expanding the center samples so as to fill the entire active scan interval of each line.

It is recognized by Reitmeier et al. that expanding the center samples of each line to accomplish aspect ratio reduction will reduce the color subcarrier frequency of the composite wide screen signal in proportion to the amount of time expansion. Specifically, if the aspect ratio is changed from 5:3 to 4:3, then the color subcarrier of the composite signal will be reduced in proportion to the aspect ratio of the expanded signal divided by the aspect ratio of the original signal which, in this case, corresponds to a reduction of 20 percent.

Reitmeier recognized that the reduction in the color subcarrier frequency of the expanded 4:3 aspect ratio composite video signal precluded direct demodulation of the expanded signal using the color burst component of the wide screen signal. To solve this problem the luminance and chrominance components of the expanded signal are separated and the chrominance components are demodulated to baseband using a demodulation carrier wave of reduced frequency derived from the color burst component of the wide screen input signal by means of a phase lock loop (PLL) circuit. The baseband components are then matrixed to generate RGB components for display on a standard (4:3 aspect ratio) kinescope.

SUMMARY OF THE INVENTION

It is recognized herein that an "NTSC-like" wide screen signal format of the general type proposed by Reitmeier et al. would be particularly useful for new television transmission services, such as direct broadcast satellite (DBS), because of the relative ease of providing functions such as aspect ratio conversion as compared, for example, to other transmission systems such as MAC (multiplexed analog component). As an example, in the Reitmeier et al. system only two one-line memories are required for aspect ratio conversion of a composite signal whereas more memories are required in MAC systems because the components are separate rather than being combined in the composite format.

The present invention resides in part in recognizing the need to simplify the process of aspect ratio reduction in an "NTSC-like" wide-screen composite video transmission system. In particular, a need exists for an aspect ratio converter that provides proper color subcarrier translation while avoiding the need for chromaluminance component separation and color component demodulation. A further need exists for a wide-screen composite video transmission signal format which preserves the horizontal resolution of a given broadcast standard (e.g., NTSC, PAL etc) when subjected to aspect ratio reduction. The present invention is directed to meeting these needs.

An encoder embodying the invention includes a first signal source for providing a video signal in component form representative of a wide-screen image having an aspect ratio greater than a standard value and having line and field rates conforming to a given broadcast standard. A second signal source provides a color subcarrier signal having a frequency proportional to a standard color subcarrier frequency multiplied by the aspect ratio of said wide-screen image and divided by the standard aspect ratio. A modulator means, responsive to the color subcarrier signal of the second source, modulates the chrominance components on respective quadrature related carrier waves. An output means combines the luminance and modulated chrominance components and inserts a color burst component of a frequency related to the color subcarrier frequency in the combined signals to form a wide-screen composite video output signal.

In accordance with a further feature of the invention the encoder includes bandwidth modifying means for setting the bandwidth of the components of the composite signal to respective values, each value being greater than a corresponding value of the given broadcast standard in proportion to the aspect ratio of the wide screen image divided by the standard aspect ratio.

A decoder embodying the invention includes input means for receiving a wide screen composite video signal of the type described. A circuit means, coupled to the input means, time expands center samples of each active line of the input signal to provide a composite video output signal having an aspect ratio and a color subcarrier frequency conforming to the given broadcast standard.

In accordance with a further feature of the invention, the color burst component is of the same frequency as the color subcarrier and the decoder includes means for translating the color burst component of the wide screen signal to a frequency conforming to the given broadcast standard and for inserting the translated color burst component in the composite video output signal.

BRIEF DESCRIPTION OF THE DRAWING

The foregoing and further features of the invention are illustrated in the accompanying drawing wherein.

DETAILED DESCRIPTION

Figure 1:
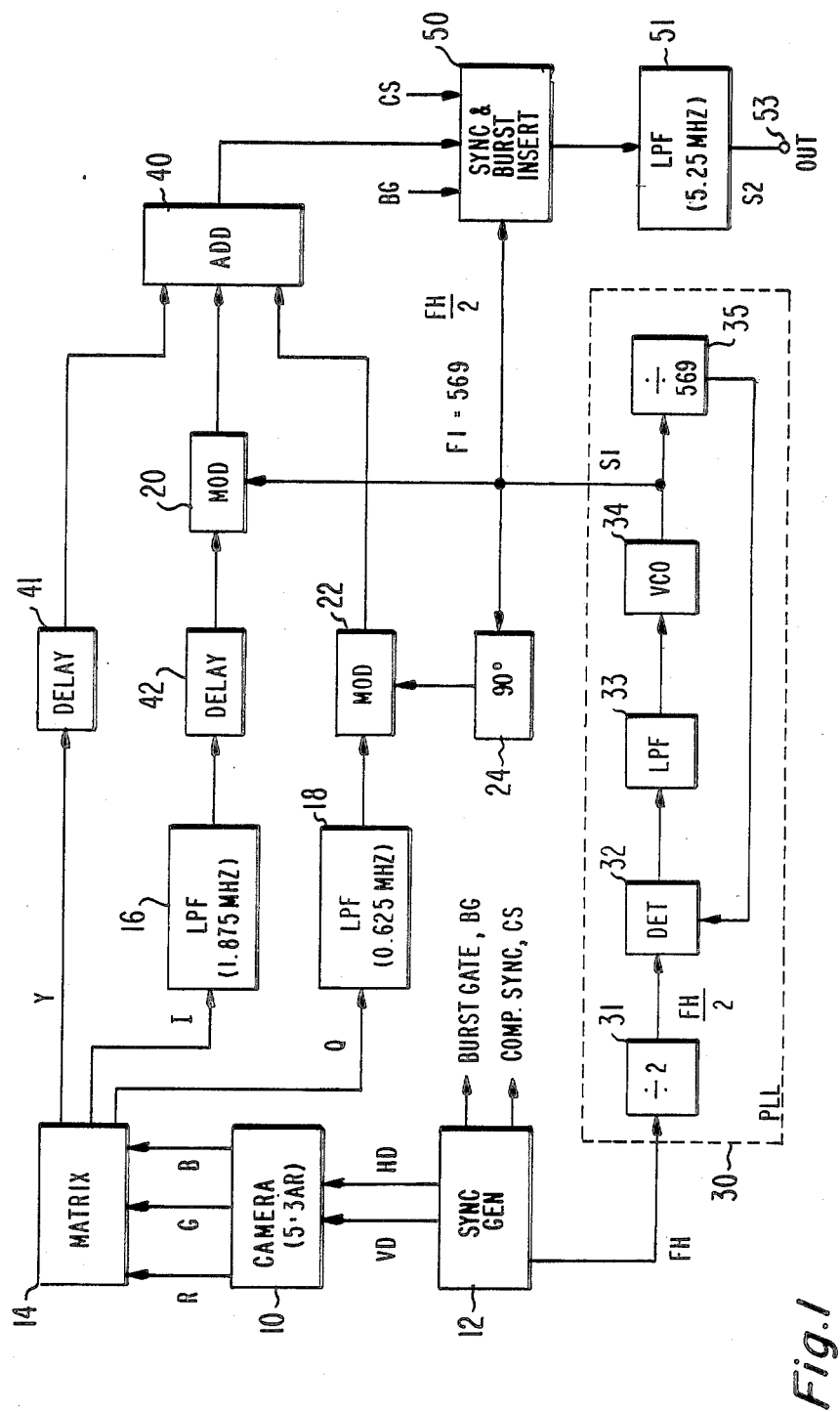
FIG. 1 is a block diagram of an encoder embodying the invention.

The encoder of FIG. 1 generates a wide-screen composite video signal similar to the format proposed by Reitmeier et al. but modified in accordance with the invention so as to facilitate subsequent conversion to standard (4:3) aspect ratio for display on conventional receivers. In particular, signal parameters are changed in such a manner that aspect ratio reduction of the composite signal can be performed in a decoder without need for component separation and demodulation thereby avoiding a loss of signal quality normally associated with signal separation and demodulation. As a result, the decoder is greatly simplified and provides a much higher quality output signal than can be obtained from a decoder which separates the composite signal into components and subjects the components to demodulation.

To achieve these decoding benefits, the wide screen signal must be of a very special form in which the chroma subcarrier is increased in frequency relative to a given broadcast standard in proportion to the aspect ratio of the wide screen signal divided by the aspect ratio of a conventional TV display (e.g., 4:3). To maintain the same horizontal resolution as in the given broadcast standard it is also necessary to increase the bandwidth of the wide screen components by the same ratio. The encoder of FIG. 1 provides these features.

In detail, the encoder of FIG. 1 includes a camera 10 supplied with vertical and horizontal drive signals (VD, HD, respectively) of NTSC standard frequencies from a synchronizing signal generator 12. Normally, the camera 10 would produce a standard 4:3 aspect ratio picture but in the present invention the amplitude of the vertical drive signal VD is reduced by about 20 percent. This decrease in the vertical scan direction will increase the aspect ratio of the RGB camera output signals to 5:3. Camera 10, alternatively, may be a telecine machine or another suitable source of wide screen video signals having NTSC standard line and field rates and a wide screen aspect ratio. Although the NTSC standard and a 5:3 aspect ratio is chosen for purposes of illustrating the invention, it will be appreciated that the principles apply as well to other aspect ratios and to other standards such as PAL or SECAM.

The RGB camera signals are applied to a matrix 14 which converts them to YIQ form. The I and Q components are low pass filtered by filters 16 and 18, respectively, and applied to respective modulators 20 and 22. The bandwidth of filters 16 and 18 are selected to be 1.875 MHz and 0.625 MHz, respectively. These bandwidths are about 1.25 times the standard NTSC bandwidth for the I and Q signals. The factor 1.25 corresponds to the aspect ratio of the wide screen signal (5:3) divided by the aspect ratio of a standard kinescope (4:3). The luminance signal Y bandwidth is similarly increased (to 5.25 MHz) relative to the NTSC standard Y bandwidth (4.2 MHz) by output filtering as will be explained.

Figure 2:
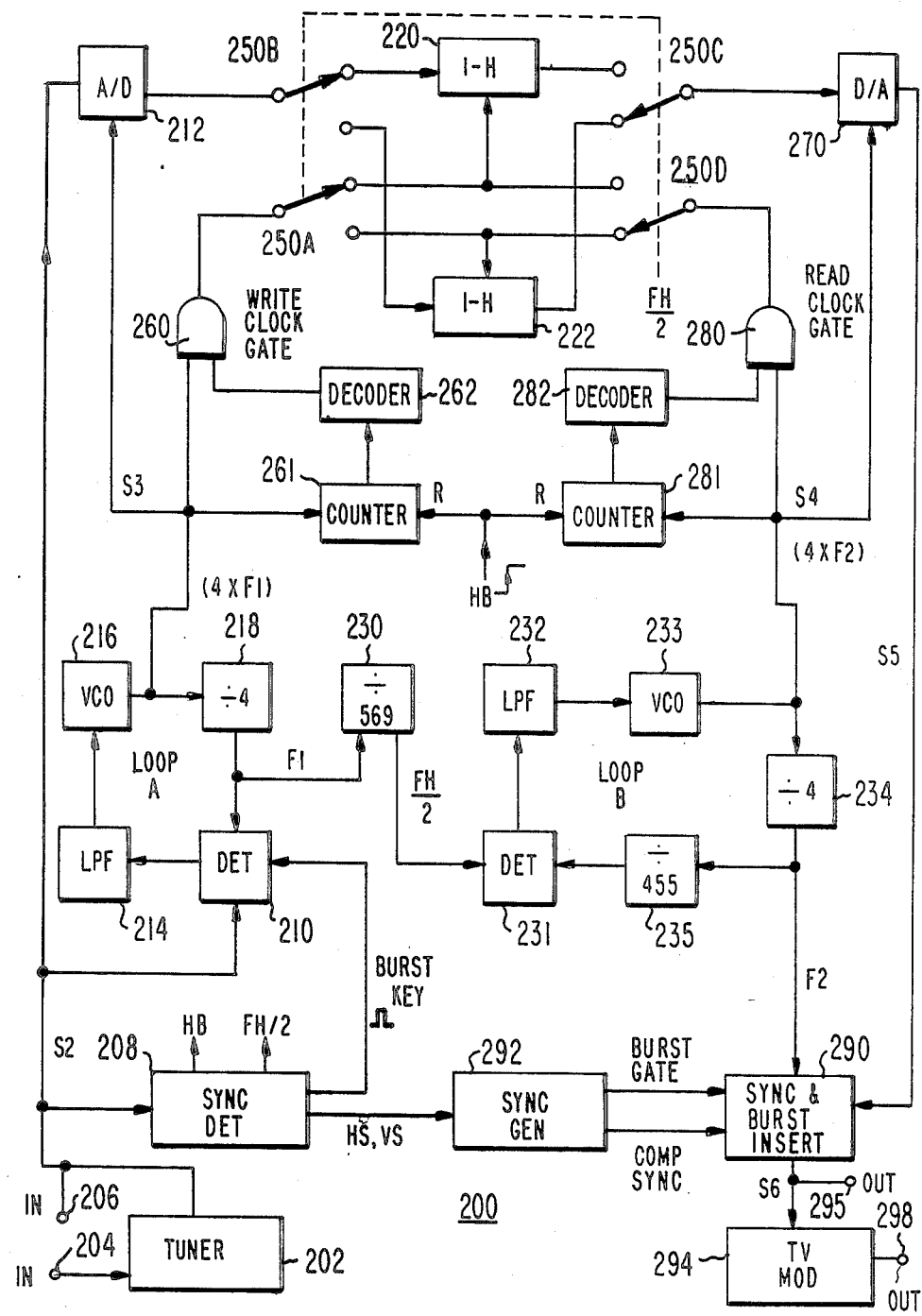
FIG. 2 is a block diagram of a decoder embodying the invention.

The reason for increasing the bandwidth of the Y, I and Q components in proportion to the aspect ratio of the wide screen signal relative to the standard aspect ratio (4:3) is to preserve the standard NTSC bandwidths when the wide screen signal is reduced in aspect ratio to 4:3 in the decoder of FIG. 2. The aspect ratio conversion from 5:3 to 4:3 is performed in the decoder by time expanding the center samples of each line of the wide screen signal that correspond to a 4:3 aspect ratio picture. The expansion reduces the component bandwidth in the same proportion that the bandwidth is enhanced in the encoder. Accordingly, the reduced aspect ratio signal will conform to NTSC component bandwidth standards and so will have NTSC standard resolution.

The filtered I and Q signals are modulated by modulations 20 and 22 on respective quadrature related subcarriers having a frequency (F1) equal to 569 times half the line rate (FH/2) of the wide screen signal. The subcarrier signal (S1) is provided by a phase lock loop (PLL) 30. A quadrature relationship is established by delaying S1 applied to modulator 22 by a 90 degree phase shift network 24.

The subcarrier frequency F1 of 569 (FH/2) is specially selected to facilitate subsequent aspect ratio reduction from 5:3 to 4:3 in the decoder of FIG. 2. This number is the closest odd multiple of one-half the NTSC standard line rate which will provide a subcarrier frequency proportional to the aspect ratio of the wide screen signal divided by the standard aspect ratio of 4:3. There are two aspects to this choice. Firstly, an odd multiple is chosen to ensure that the chroma spectra are interlaced with the luma spectra of the wide screen signal (frequency interleaving). Secondly, the aspect ratio relationship is chosen so that the subcarrier frequency of the chroma components will equal the NTSC standard (about 3.58 MHz) after the aspect ratio of the wide screen signal is reduced in the decoder by expansion of the 4:3 center portion of each active line.

PLL 30 generates signal S1 by dividing a line rate (FH) signal provided by generator 12 by two and multiplying the result by 569. Specifically, FH is applied to a divider 31 and the divider output (FH/2) is applied to a phase detector 32 which compares a feedback signal from a divider 35 with FH/2 to supply a control voltage via low pass filter 33 to a VCO 34 which, in turn, generates S1 and supplies clock signals to divider 35. At lock, VCO 34 is regulated by feedback from divider 35 to operate at frequency F1 (i.e., 569 FH/2). This frequency, F1, is about 4.47 MHz.

The choice of a specific subcarrier frequency F1 for signal S1 is selected as follows. First the aspect ratio (5:3) of the wide screen signal is divided by the aspect ratio of a standard kinescope (4:3). The quotient (1.25 for this example) is then multiplied by the standard color subcarrier frequency (3.58 MHz, NTSC). The product (4.47 MHz) is then compared with frequencies that are odd multiples of half the line-rate. The closest multiple (here, 569) of FH/2 to the product (4.47 MHz) is then selected for S1.

After modulation on respective carrier waves, the I and Q signals are combined with the luma signal in adder 40. Signals Y and I are delayed in units 41 and 42 prior to addition to compensate for the delay of the Q bandpass filter. The combined signals are then applied to sync and burst insertion unit 50 which receives the subcarrier signal S1 from PLL 30 and receives a burst gate (BG) and a composite sync (CS) signals from generator 12. Unit 50 inserts burst (at 4.47 MHz) and composite sync in the combined signals to form a wide screen composite video output signal S2 which is coupled to output 53 by means of a 5.25 MHz low pass filter 51. Filter 51, in conjunction with filters 16 and 18, provide limitation of the signal bandwidths to values 1.25 times the NTSC standards. This ensures, a previously explained, that the wide screen signal (S2) will have full NTSC resolution when aspect ratio reduced from 5:3 to 4:3 in the decoder.

Wide screen composite video signal S2 may be subjected to other studio processing (recording, editing, etc.) prior to transmission (via satellite, for example) to a wide-screen receiver for display. The decoder of FIG. 2 may be used for converting signal S2 to a form suitable for display on conventional (4:3 aspect ratio) NTSC standard receivers. Advantageously, the decoder performs the conversion of the composite signal without separation of components or demodulation thus avoiding a loss of signal quality normally associated with such processes.

The decoder (200) of FIG. 2 includes a tuner 202 having an input 204 for receiving the wide screen signal in RF form and an output for providing signal S2 in baseband form. An auxiliary input 206 is provided for receiving signal S2 in baseband form from a source (e.g., a VCR) having baseband outputs. Signal S2 is applied to a sync detector 208, a phase detector 210 and to an analog-to-digital converter (A/D) 212. Sync detector 208 generates various timing signals including horizontal blanking (HB) and half line-rate (FH/2) signals, a burst keying signal and vertical and horizontal synchronizing signals (HS and VS).

Signal S2 is sampled and converted to digital form in converter 212 by means of a clock signal S3 having a frequency equal to four times the color subcarrier of signal S2. Signal S3 is produced by a phase lock loop (LOOP A) comprising phase detector 210 which is keyed by the burst key signal provided by sync detector 208 and connected in a loop with low pass filter 214, VCO 216 and a divide-by-four divider 218. At lock, divider 218 provides an output signal locked to the color subcarrier frequency F1 and VCO 216 provides signal S3 at a frequency of 4×F1.

Signal S3 (at 4×F1) is used as a write clock for controlling storage of the S2 samples in one-line memories 220 and 222 as will be described. A read clock signal S4 for the memories is derived from the color subcarrier frequency F1 (produced by divider 218 of LOOP A) by dividing F1 by 569 in divider 230. Since F1 was generated in the encoder by multiplying a half line rate (FH/2) signal by 569, the output of divider 230 is a half line rate signal FH/2. This signal is applied to the phase detector 231 of another phase lock loop (LOOP B) including a low pass filter 232, a VCO 233, a divide-by-four divider 234 and a divide-by-455 divider 235 connected in a loop. At lock, the output of divider 234 equals 455 (FH/2) which is the standard NTSC color subcarrier frequency F2 and VCO 233 provides a clock signal S4 equal to four times F2.

Aspect ratio conversion and color subcarrier frequency translation are provided by 1-H memories 220 and 222 by alternately storing the samples of the wide screen signal corresponding to the 4:3 aspect ratio center portion of each line in the memories. As one memory is storing the center samples at the 4×F1 clock rate, the stored samples in the other memory are read at the 4×F2 clock rate.

Figure 3:
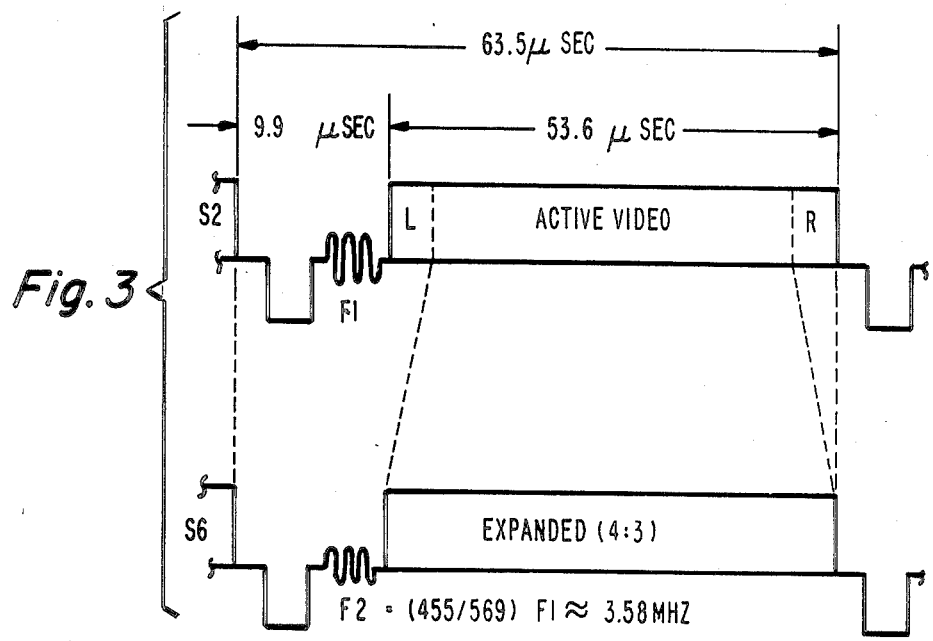
FIGS. 3, 4 and 5 are diagrams illustrating operation of the decoder of FIG. 2.
Figure 4:
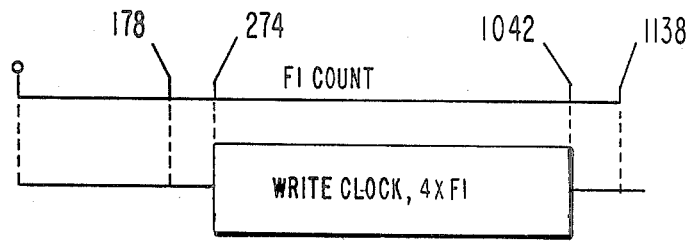

In detail, read-write control and clock frequency selection is provided by a four section switch 250A-250D. For the switch position shown, section 250B applies signal S2 to memory 220 and section 250A applies the write clock signal S3 to memory 220. Signal S3 is gated by means of write clock gate 260 so as to store only samples corresponding to the 4:3 aspect ratio image in memory 220. Gate 260 is controlled by a counter 261 which counts pulses of the 4×F1 clock signal and decoder 262 which enables the write clock gate between counts 274 and 1042 as shown in FIG. 4. Count range 0-178 corresponds to the blanking interval of signal S2. Count range 178-274 corresponds to the left edge (L) of the wide screen signal (see FIG. 3). Count 274-1042 corresponds to the center portion of the wide screen signal that represents a 4:3 aspect ratio picture. Count range 1042-1138 corresponds to the right edge of the wide screen image (R of FIG. 3).

Figure 5:
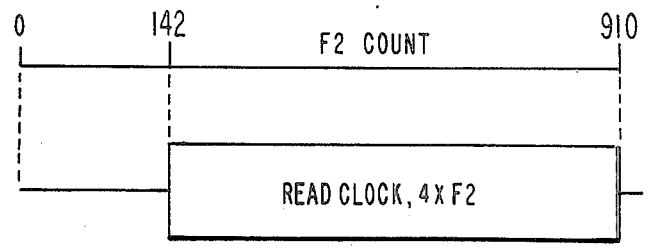

At the same time as memory 220 is storing the center samples of the active line of the wide screen signal, memory 222 is being read by the lower frequency (4×F2) clock signal S4 and switch section 250C couples the output of memory 222 to digital to analog converter 270. Switch section 250D applies read clock pulses gated by gate 280 to memory 222. Gate 280 is controlled by counter 281 which counts pulses of the 4×F2 read clock. The count is decoded by decoder 282 to clock memory 222 between counts of 142 and 910 as shown in FIG. 5. Accordingly, the 768 samples (1042 minus 274) previously stored in memory 222 are recovered during a read operation (count 142 to 910) but at the lower clock rate of 4×F2. This expands the recovered active line of the composite video signal by the ratio of the clock signals F1/F2 as shown in FIG. 3. During the next line interval the position of switch 250 is reversed and the cycle is repeated.

The output signal (S5) of D/A converter 270 comprises the active line portion of a composite video signal having a 4:3 aspect ratio and an NTSC standard color subcarrier frequency. The final step of conversion to NTSC standards is provided by a sync and burst insertion unit 290. NTSC standard composite sync signals and a burst gate signal are generated by a sync generator 292 and supplied to inserter 290. Unit 290 adds the composite sync signals to the expanded active video signal S5 and inserts burst (F2) provided by LOOP B to generate a standard baseband NTSC output signal S6 at terminal 295. This signal conforms to all NTSC standards and may be recorded on a VCR or displayed on a conventional receiver having baseband inputs. A TV modulator 294 is included for supplying (at output 298) an RF output signal on a selected channel. It will be noted that the wide screen signal is processed in composite form at every stage in the conversion process thereby avoiding loss of signal quality characteristic of systems which separate components and demodulate color components.

Figure 6:
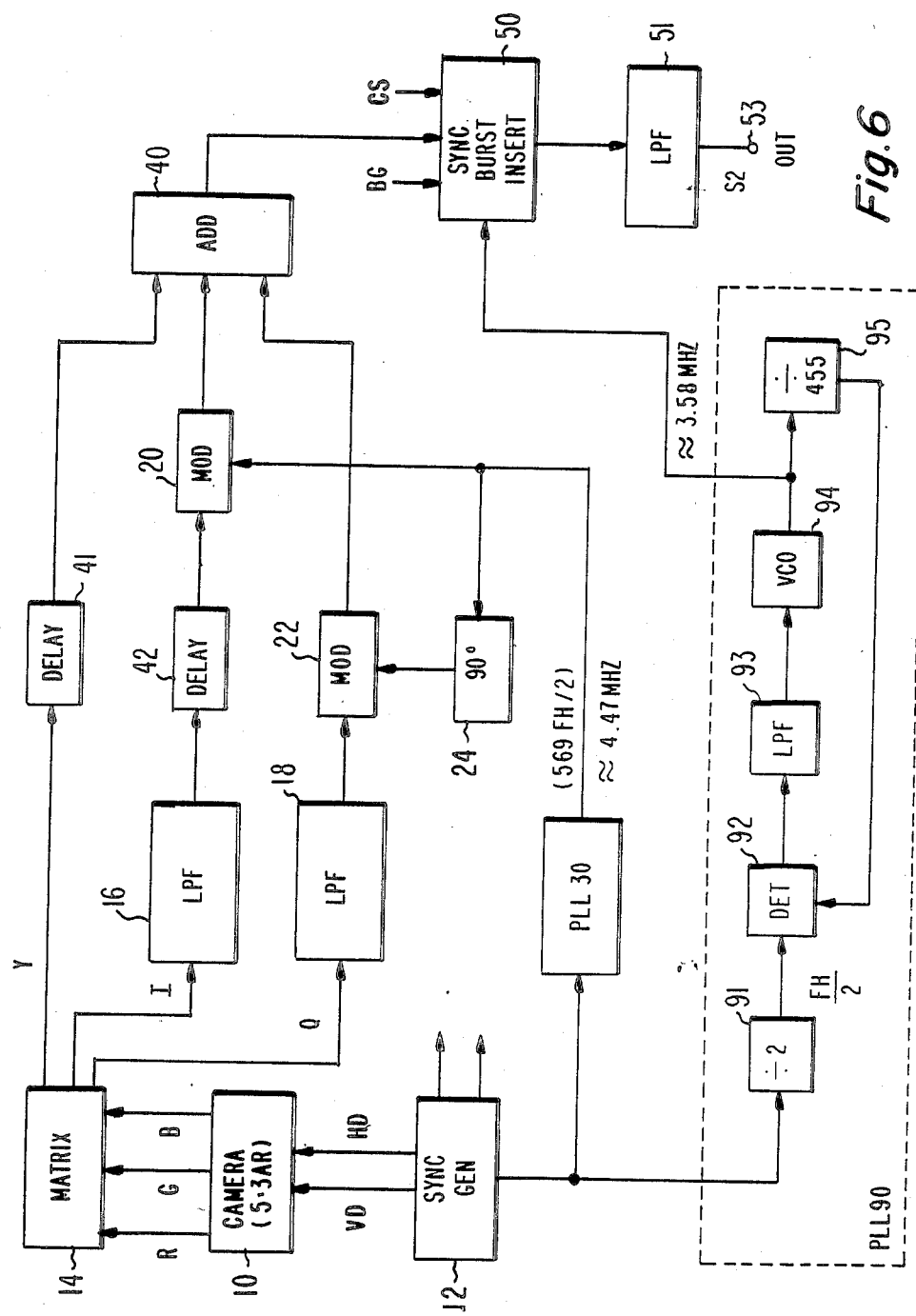
FIGS. 6 and 7 illustrate modifications of the encoder of FIGS. 1 and 2, respectively.
Figure 7:
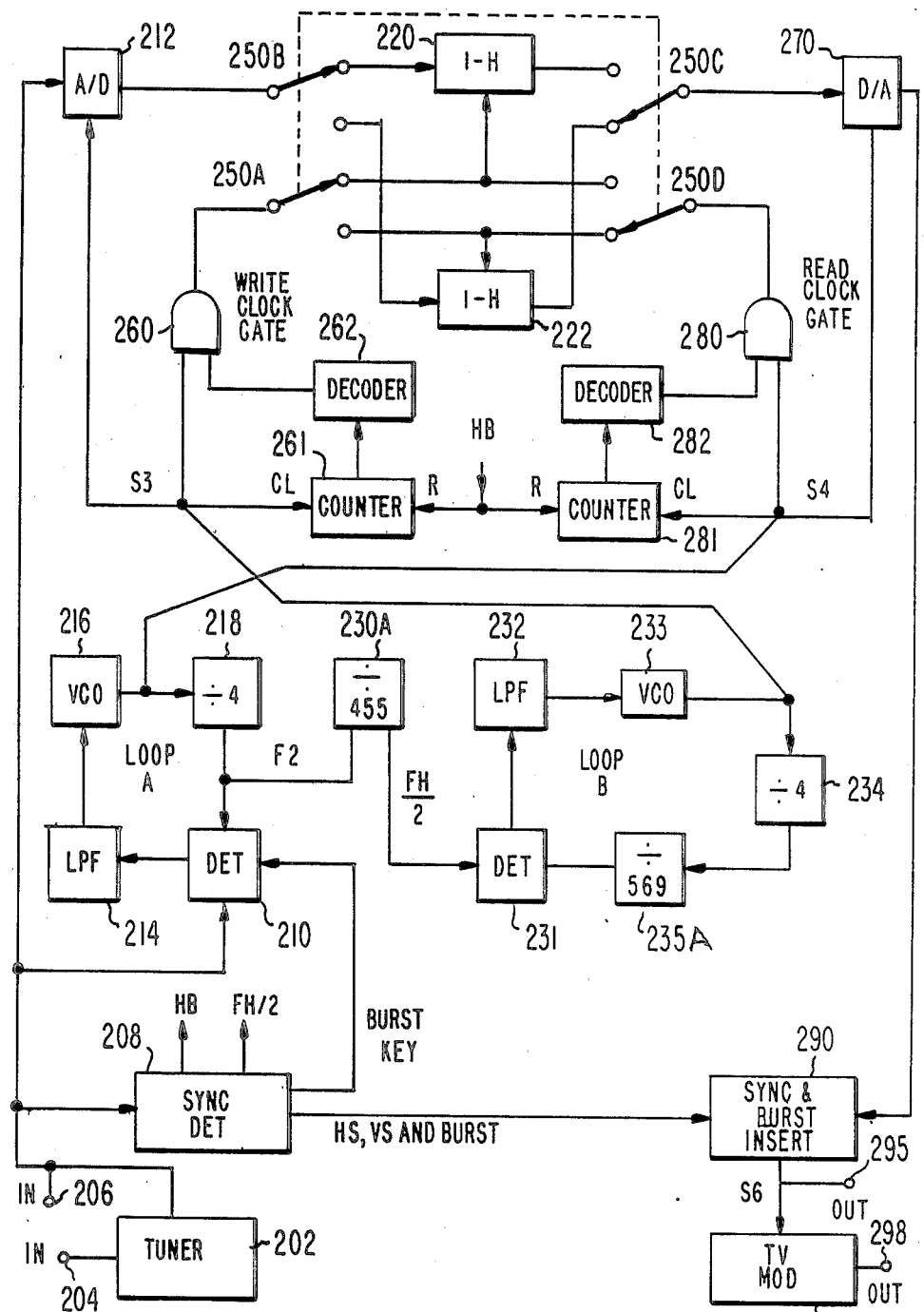

FIGS. 6 and 7 illustrate modifications of the encoder and decoder of FIGS. 1 and 2 in which the color burst frequency of the wide screen signal is changed to the NTSC standard (about 3.58 MHz). The color subcarrier frequency (about 4.47 MHz) is not changed. This modification provides further simplification of processing in the decoder.

In the encoder (FIG. 6) a phase lock loop 90 is added which produces an output frequency of the NTSC standard (455 FH/2 or about 3.58 MHz). Loop 90 comprises a divide-by-two counter 91 (which divides signal FH by two) and a loop comprising phase detector 92, low pass filter 93, VCO 94 and divide by 455 divider 95. When in lock, the loop provides an output signal of 455 FH/2 (i.e., 3.58 MHz) at the VCO 94 output. This signal is inserted as the burst component of the wide screen output signal S2 by sync and burst insertion unit 50.

Accordingly, the wide screen signal has line, field, and color burst components conforming to the NTSC standard and color subcarrier components at a higher frequency (i.e., F2 times (569/455) F1) proportional to the standard frequency times the aspect ratio of the wide screen signal divided by the aspect ratio of the standard (4:3).

In the modified decoder of FIG. 7, LOOP A will lock to the NTSC burst component of the wide screen signal and produce a read clock frequency of 4 F2 and a F2 burst frequency. Accordingly the VCO output of LOOP A is used as the read clock for memories 220 and 222. Signal F2 (from divider 218) is divided by 455 (in divider 230A) to generate FH/2. LOOP B is modified to generate 569 FH/2 by replacing divider 235 by divider 235A. This signal is used as the write clock for memories 220 and 222. Sync generator 292 is omitted and the sync and the color burst (3.58 MHz) of the wide screen signal are applied directly to the sync and burst insertion unit 290.

Operation of the modified decoder is the same as in FIG. 2 except for the generation of the read and write clock frequencies and the omission of unit 292. Here, the write clock frequency is derived from the read clock frequency rather than vice versa as in the decoder of FIG. 1. As previously noted, the use of an NTSC standard color burst and a higher subcarrier frequency for the chroma components allows use of the wide screen burst in the decoder thereby simplifying decoder construction.

It will be appreciated that other principles of the invention apply to the video standards such as PAL or SECAM. Also, although the invention as been illustrated for the specific case of a 5:3 aspect ratio wide screen image, other wide screen aspect ratios may be used by appropriate scaling of compression factors and color subcarrier frequencies.

What is claimed is:

1. An encoder for producing a wide-screen composite video output signal, comprising:
   first signal source means for providing a wide-screen video signal in component form including a luminance component, a first chrominance component and a second chrominance component, said components being representative of a wide-screen image having an aspect ratio greater than a standard aspect ratio and having line and field rates conforming to a given broadcast standard;
   second signal source means for providing a color subcarrier signal having a selected frequency proportional to a standard color subcarrier frequency multiplied by said aspect ratio of said wide-screen image and divided by said standard aspect ratio, said selected frequency also being an odd multiple of one-half said line rate of said given broadcast standard;
   modulator means responsive to said color subcarrier signal of said second signal source means for modulating said chrominance component signals on respective quadrature related carrier waves; and
   output means for combining said luminance component and said modulated chrominance components and for inserting a color burst component having a frequency equal to said standard color subcarrier signal to form said wide-screen composite video output signal.

2. An aspect ratio converter, comprising:
   input means for receiving a composite video input signal representative of a wide-screen image having an aspect ratio greater than a standard value, said input signal having line and field rates conforming to a given broadcast standard and having a color subcarrier component of a frequency proportional to a standard color subcarrier reference frequency multiplied by said aspect ratio of said wide screen image and divided by said standard aspect ratio, said input signal having a color burst component equal to said standard color subcarrier reference frequency; and
   circuit means coupled to said input means for time expanding center samples of each active line of said composite video input signal to provide a composite video output signal having an aspect ratio and color subcarrier frequency conforming to said given broadcast standard and wherein:
   said circuit means includes means for inserting said color burst component in said video output signal without frequency translation of said color burst component.

* * * * *